Figure 1:
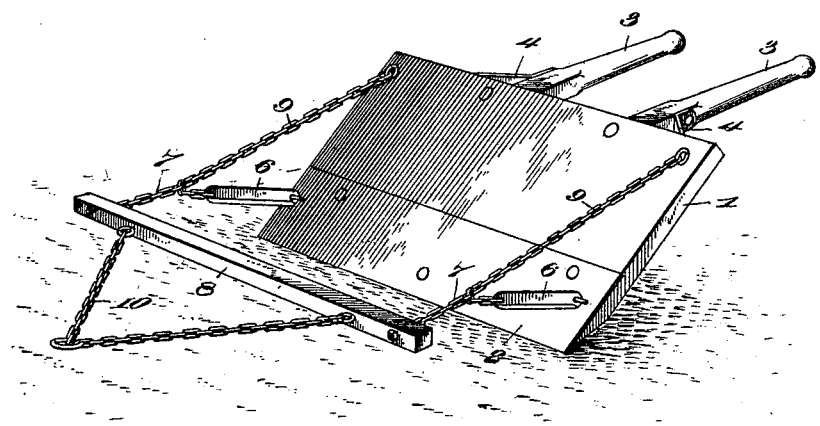

No. 622,228. Patented Apr. 4, 1899.
W. W. HUNTER.
DITCHING MACHINE.
(Application filed Feb. 4, 1898.)
(No Model.)

Witnesses
W. F. Doyle
V. B. Hillyard

William W. Hunter, Inventor
By his Attorneys,
C. A. Snow & Co.

UNITED STATES PATENT OFFICE.

WILLIAM W. HUNTER, OF SHIOCTON, WISCONSIN.

DITCHING-MACHINE.

SPECIFICATION forming part of Letters Patent No. 622,228, dated April 4, 1899.

Application filed February 4, 1898. Serial No. 669,118. (No model.)

*To all whom it may concern:*

Be it known that I, WILLIAM W. HUNTER, a citizen of the United States, residing at Shiocton, in the county of Outagamie and State of Wisconsin, have invented a new and useful Ditching-Machine, of which the following is a specification.

A ditching-machine which will be of comparatively light draft and easy of manipulation and which will be uniform of action when in operation and enable the attendant to handle the load with ease and despatch is a desideratum, and it is the purpose of this invention to provide a machine which will fulfil these conditions.

The improvement relates more particularly to the draft connections whereby the animal or team is hitched to the machine, whereby when constructing ditches or trenches the animal can walk upon the bank and the machine be handled so as to construct, deepen, or otherwise shape the size of the ditch, as required.

Other objects and advantages are contemplated and will appear to those skilled in the construction and use of this class of devices as the details of the organized structure are comprehended; and to these and such other ends as appertain to the nature of the invention reference is to be had to the following description and the views of the drawings hereto attached, in which corresponding and like parts are designated and referred to by the same reference characters.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 3:
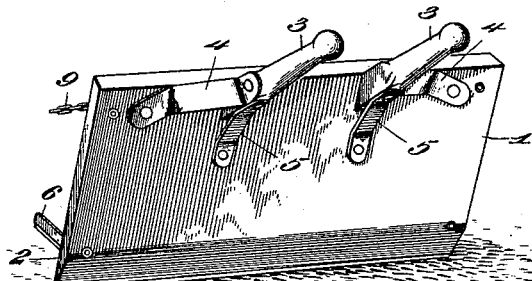
Figure 2:
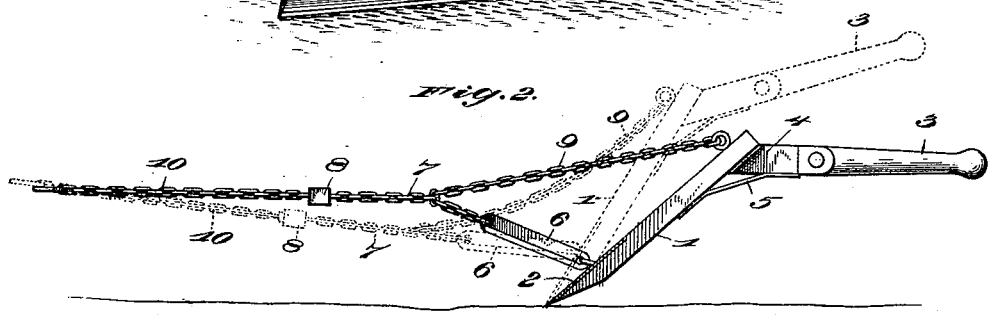

Figure 1 is a perspective view of a ditching-machine embodying the essential features of this invention. Fig. 2 is a side elevation thereof, the dotted lines showing the handles elevated, so as to enable the operator to control the machine when it is required to dump or otherwise dispose of the load. Fig. 3 is a rear perspective view.

The bed 1 of the machine is flat and straight throughout its area and is reinforced at its lower edge by means of a plate 2, bolted or otherwise secured thereto, the lower edge of said plate being beveled at its rear side to provide a chisel cutting edge. Handles 3 are secured to the rear side of the bed at or near its upper edge and are strengthened by lateral braces 4 and longitudinal braces 5, the latter also serving to stiffen and stay the bed 1.

Short longitudinal bars 6 have loose connection at their rear ends with the side portions of the bed 1 a short distance from its active or cutting edge and are adapted to swing vertically, laterally, and in all directions conformable to the point of application of the draft. Side chains or like connections 7 are made fast at their rear ends to the front ends of the bars 6 and are secured at their front ends to the extremities of a transverse draft-bar 8. The lower edges of the longitudinal or side bars 6 are sharpened, thereby enabling said bars to act in the capacity of cutters to cut through lumps or clods of earth and loosen the soil in advance of the ditcher and near the sides thereof, so as to enable the side walls of a trench or ditch to be more easily scraped, as will be understood. These side bars 6 also serve to retain the load of earth from lateral displacement, inasmuch as they provide forward and outward extensions to the bed 1. Other chains or similar connections 9 are secured at their rear ends to the upper corners of the bed 1 and have connection at their front ends with the side chains 7 at a point intermediate of their length. The provision of the connections 6, 7, and 9 enables the draft to be applied to the four corner portions of the bed as required to meet existing conditions, the draft being thrown more or less or distributed evenly upon the upper and lower set of connections, according to the position of the handles 3. By depressing the rear ends of the handles the draft is thrown upon the upper set of connections and the machine held to its work, and when elevating the rear ends of the handles the draft is transferred to the lower set of connections. By moving the handles to an intermediate position the draft may be thrown equally upon the upper and lower set of connections, thereby enabling the operator to spread or dump the load in a heap, as required.

A crotch or V-shaped draft-chain 10 is secured at its ends to the end portions of the draft-bar 8 and is provided at a central point with a ring for connection therewith of the draft animal or team. This construction admits of the draft-bar 8 being interposed between the draft connection 10 and the draft connections 6, 7, and 9 and enables the animal to obtain a firm footing upon the bank of the trench and the machine to be operated conveniently upon either the bottom or side of the trench.

Having thus described the invention, what is claimed, and desired to be secured by Letters Patent, is—

1. In a ditching-machine, the combination with the bed having operating-handles, of draft connections including side bars having loose connection with the lower outer portions of the bed within the side edges thereof and having their lower edges sharpened to cut and loosen the soil in advance of the bed, substantially as and for the purpose set forth.

2. In a ditching-machine, the combination with the bed provided with operating-handles, of upper and lower draft connections secured to the side portions of the bed near the top and bottom providing four points of connection and joined at their front ends by the draft-bar, whereby the draft may be applied wholly or partly to either set of draft connections or evenly distributed thereon, substantially as and for the purpose set forth.

3. The herein-described ditching-machine, comprising a bed, rearwardly-extending handles at the upper edge of the bed, braces connecting the said handles with the bed, a transverse draft-bar, a crotch draft-chain having its end portion secured to the end portions of the draft-bar, side bars having loose connection with the lower corners of the bed, connections between the draft-bar and the outer ends of the said side bars, and other connections between the upper rear corners of the bed and the connections between the said side bars and draft-bar, substantially as and for the purpose set forth.

In testimony that I claim the foregoing as my own I have hereto affixed my signature in the presence of two witnesses.

WILLIAM W. HUNTER.

Witnesses:
F. J. BARNES,
A. K. DEWICK.